United States Patent
Seo et al.

(10) Patent No.: US 10,616,566 B2
(45) Date of Patent: Apr. 7, 2020

(54) 3D IMAGE DISPLAY SYSTEM AND METHOD

(71) Applicant: KOREA INSTITUTE OF SCIENCE AND TECHNOLOGY, Seoul (KR)

(72) Inventors: Dae Il Seo, Seoul (KR); Byoung Hyun Yoo, Seoul (KR); Hee Dong Ko, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 50 days.

(21) Appl. No.: 15/648,739

(22) Filed: Jul. 13, 2017

(65) Prior Publication Data
US 2018/0027229 A1 Jan. 25, 2018

(30) Foreign Application Priority Data

Jul. 22, 2016 (KR) .................. 10-2016-0093328
Aug. 23, 2016 (KR) .................. 10-2016-0106910

(51) Int. Cl.
| | |
|---|---|
| G06T 15/00 | (2011.01) |
| H04N 13/194 | (2018.01) |
| H04N 13/351 | (2018.01) |
| G06T 15/80 | (2011.01) |
| G06T 1/60 | (2006.01) |
| H04N 13/144 | (2018.01) |
| H04N 13/31 | (2018.01) |
| H04N 13/398 | (2018.01) |

(Continued)

(52) U.S. Cl.
CPC ............ *H04N 13/351* (2018.05); *G06T 1/60* (2013.01); *G06T 15/005* (2013.01); *G06T 15/80* (2013.01); *G09G 3/003* (2013.01); *G09G 5/00* (2013.01); *H04N 13/144* (2018.05); *H04N 13/178* (2018.05); *H04N 13/194* (2018.05); *H04N 13/31* (2018.05); *H04N 13/398* (2018.05); *G06T 2200/28* (2013.01); *G09G 2320/08* (2013.01)

(58) Field of Classification Search
CPC ........................... H04N 13/351; H04N 13/178
USPC .......................................................... 348/51
See application file for complete search history.

(56) References Cited

U.S. PATENT DOCUMENTS

| | | | |
|---|---|---|---|
| 2005/0259147 A1* | 11/2005 | Nam ................ | H04N 21/2343 348/43 |
| 2008/0211977 A1* | 9/2008 | Ijzerman ............. | H04N 13/302 349/15 |

(Continued)

FOREIGN PATENT DOCUMENTS

| | | |
|---|---|---|
| KR | 10-2011-0136851 A | 12/2011 |
| KR | 10-2013-0075253 A | 7/2013 |

(Continued)

OTHER PUBLICATIONS

Korean Office Action dated Jul. 25, 2017.

*Primary Examiner* — Frederick D Bailey
*Assistant Examiner* — Amir Shahnami
(74) *Attorney, Agent, or Firm* — Rabin & Berdo, P.C.

(57) ABSTRACT

A three-dimensional (3D) image display system includes a profile information provider configured to provide profile information defining a hardware characteristic of a 3D image display device, and a 3D image reproducer configured to collect information of the hardware characteristic of the 3D image display device from the profile information provider and render image content according to the profile information.

17 Claims, 7 Drawing Sheets

(51) Int. Cl.
*H04N 13/178* (2018.01)
*G09G 3/00* (2006.01)
*G09G 5/00* (2006.01)

(56) References Cited

U.S. PATENT DOCUMENTS

2012/0120200 A1* 5/2012 Newton ............... H04N 19/597
348/46
2013/0162630 A1* 6/2013 Kim ..................... H04N 13/366
345/419
2015/0371393 A1* 12/2015 Ramachandra ......... G06T 5/002
382/154

FOREIGN PATENT DOCUMENTS

| KR | 10-2015-0108149 A | 9/2015 |
| KR | 10-2016-0062671 A | 6/2016 |

* cited by examiner

| Attribute | Type | Description |
|---|---|---|
| physicalWidth | float | Physical width size (mm) of the screen of a display |
| physicalHeight | float | Physical heightsize (mm) of the screen of a display |
| screenWidth | integer | Number of width pixels (px) in the screen |
| screenHeight | integer | Number of height pixels (px) in the screen |
| viewpoints | integer | Number of viewpoints |
| offset | float | Distance (mm) of neighborhood viewpoints |
| distance | float | Distance (mm) between user and display |
| indexmap | integer [][] | Subpixel index for spatially multiplexed image-interleaving multi-view content |

FIG. 3

```
var MVAD40 = {
  title : '30inch 2560x1600 40 viewpoint Monitor',
  name : '40 viewpoints',
  viewCount : 40,
  monitorResolution : {width: 2560, height: 1600},
  viewOffsetRotate : 0.17,
  viewFocalLength : 0.0,
  xOffsetAboutScreenCoord : 15,
  yOffsetAboutScreenCoord : -6,
  cOffsetAboutRGB : 5,
  startViewIndex : 0
};
```

FIG. 5

3D IMAGE DISPLAY SYSTEM AND METHOD

CROSS-REFERENCE TO RELATED APPLICATION

This application claims priority to and the benefit of Korean Patent Application No. 2016-0093328, filed on Jul. 22, 2016 and Korean Patent Application No. 2016-0106910, filed on Aug. 23, 2016, the disclosure of which are incorporated herein by reference in their entirety.

BACKGROUND

1. Field of the Invention

The present invention relates to a three-dimensional (3D) image display system and method for automatically providing content that is consistent with hardware characteristics of a 3D image display such as a super multi-view image display.

2. Discussion of Related Art

With the development of wires/wireless wideband communication technology, there is an increasing demand for high quality realistic image content. Three dimensional (3D) TVs using binocular parallax were not widely used due to the inconvenience of wearing glasses and lack of content. A glassesless 3D display (an autostereoscopic display) has been suggested as an image implementation technology for addressing the limitation of a 3D display with glasses (a stereoscopic 3D display). As a glassesless 3D stereographic image representation method, a multi-view image technology capable of reproducing motion parallax has been actively developed for user convenience.

A multi-view 3D display provides a 3D image having binocular parallax and motion parallax information to an observer in front of the display by arranging a finite number of 3D viewpoint images on a space by using Time-Multiplexing or Space-Multiplexing. Such a glassesless multi-view 3D display may use a parallax barrier, a lenticular lens, or a linear light source to perform parallax separation.

An autostereoscopic multi-view 3D display among current mainstream commercial 3D products is designed to have a distance between adjacent viewing zones larger than a size of a pupil of an observer. However, such a multi-view 3D display may cause an observer fatigue in terms of human factors. A research result has been found showing that fatigue may be reduced by designing a distance between adjacent viewing zones to be smaller than the size of the pupil of an observer so that a point of accommodation of one eye coincides with a point of convergence of both eyes. A display adopting this concept is referred to as a super multi-view 3D display. In particular, a multi-view 3D display having a distance between adjacent viewing zones equal to or smaller than the size of the pupil of an observer is referred to as a high density multi-view 3D (HD-MV3D) display.

Accordingly, the use of autostereoscopic multi-view 3D displays and super multi-view 3D displays has recently increased, which has brought about a need for methods of supplying content that can be used in these display devices.

However, a rendering method of a super multi-view image for multi-view or super multi-view displays varies according to corresponding resolutions, numbers of views, viewing zone, and multiplexing methods. Therefore, the current technology reconstructs multi-view or super multi-view image content into a 3D scene according to the type and scheme thereof and detailed settings of a multi-view or a super multi-view image display, and then generates exclusive content for each multi-view or super multi-view image display. As such, there is a difficulty in supplying multi-view or super multi-view content and inconvenience of a user having to use multi-view or super multi-view content corresponding to a detailed specification of a multi-view or a super multi-view display.

PRIOR ART DOCUMENTS

Patent Documents

Patent document 1: Korean Laid-open Patent Publication No. 10-2016-0062671
Patent Document 2: Korean Laid-open Patent Publication No. 10-2015-0108149

SUMMARY OF THE INVENTION

An objective of the present invention is to provide a three-dimensional (3D) image display system and method capable of easily providing content for a lot of fragmented multi-view or super multi-view display.

In one aspect of the present invention, there is provided a 3D image display system including: a profile information provider configured to provide profile information defining a hardware characteristic of a 3D image display device; and a 3D image reproducer configured to collect information of the hardware characteristic of the 3D image display device from the profile information provider and render image content according to the profile information.

The profile information may include the number of pixels in width, the number of pixels in height, the number of viewpoints, and an index map of the 3D image display device.

The index map may be information about a viewpoint arranged on each sub-pixel of the 3D image display device.

The profile information may include the number of pixels in width, the number of pixels in height, the number of viewpoints, a width size, a height size, a distance between neighboring viewing zones of the 3D image display device, and a distance between the 3D image display device and an observer.

The 3D image reproducer may include a rendering context initializer configured to perform initialization necessary for rendering by using the profile information, a setting unit for a renderer and a shader, a camera setting unit configured to set a camera position of each viewpoint for rendering each scene of respective viewpoints represented by the 3D image display device, a buffer initializer configured to set up and initialize a buffer configured to store a result of rendering each viewpoint image to be used in the shader, a content loader configured to read image content to be played by the 3D image display device, and a rendering unit configured to render the image content.

The rendering context initializer may include a setting of the number of pixels for rendering images of each of the viewpoint.

The setting unit for renderer and shader may add a light source and sets a viewport when setting the renderer.

The profile information provider may be connected to the 3D image display device and the 3D image reproducer may be connected to the content provider and be provided with the image content.

The image content may be auto-stereoscopic multi-view image content or super multi-view image content.

In another aspect of the present invention, there is provided a 3D image display method including: reading a display profile which is hardware characteristic information of a 3D image display device; initializing a rendering context by using the profile; setting a renderer and a shader; setting a camera position of each viewpoint for rendering each scene of respective viewpoints represented by the 3D image display device; setting and initializing a buffer configured to store a result of rendering image of each viewpoint used in the shader; loading image content to be played by the 3D image display device; and rendering the image content.

The profile information may include the number of pixels in width, the number of pixels in height, the number of viewpoints, and an index map of the 3D image display device.

The index map may be information about a viewpoint arranged on each sub-pixel of the 3D image display device.

The profile information may include the number of pixels in width, the number of pixels in height, the number of viewpoints, a width size, a height size, a distance between neighboring viewing zones of the 3D image display device, and a distance between the 3D image display and an observer.

The initializing of the rendering context may include setting the number of pixels for rendering images of each of the viewpoint.

The setting of the renderer and the shader may include adding a light source and setting a viewport when setting the renderer.

The image content may be auto-stereoscopic multi-view image content or super multi-view image content.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 3 is a diagram showing an example of a table including profile information of the 3D image display device;

FIG. 5 shows an example of display profile information;

DETAILED DESCRIPTION OF EXEMPLARY EMBODIMENTS

Figure 1:
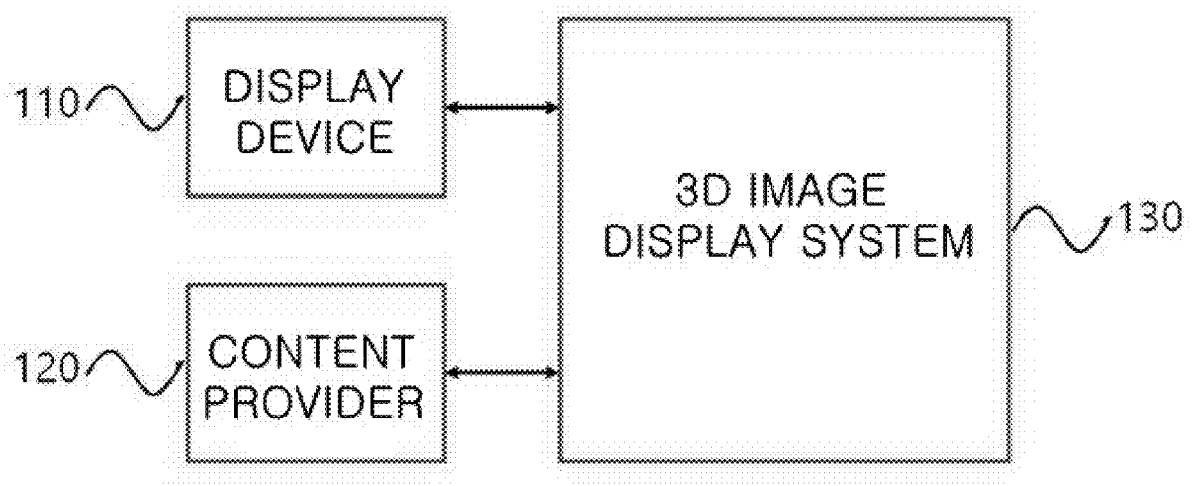
FIG. 1 is a block diagram illustrating a three-dimensional (3D) image display system according to an exemplary embodiment of the present invention.

Advantages and features of the present invention and methods of achieving the same should become apparent by referring to the embodiments described below in detail with reference to the accompanying drawings. However, the present invention is not limited to the embodiments described below and various modifications may be made thereto. The embodiments are merely provided to thoroughly disclose the invention and to convey the category of the invention to one of ordinary skill in the art. The present invention is defined by the appended claims. The same reference numerals denote the same elements throughout the specification. As used herein, the term "and/or" includes any and all combinations of one or more of the associated listed items.

Although the terms first, second, etc. may be used herein to describe various elements, components, regions, layers, and/or sections, these elements, components, regions, layers, and/or sections are not necessarily limited by such terms. These terms are only used to distinguish one element, component, region, layer, or section from another element, component, region, layer, or section. Thus, a first element, component, region, layer, or section discussed below could be termed a second element, component, region, layer, or section without departing from the teachings of the present disclosure.

Identification letters (e.g., a, b, c, etc.) in each step or operation are used for the sake of explanation and do not describe any particular order. Each of the operations may be changed from a mentioned order unless specifically mentioned in context. Namely, each of the steps may be performed in the same order as described, may be substantially simultaneously performed, or may be performed in reverse order.

The terminology used herein is for the purpose of describing particular embodiments only and is not intended to be limiting of the invention. As used herein, the singular forms "a," "an," and "the" are intended to include the plural forms as well, unless the context clearly indicates otherwise. It should be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It should be further understood that terms, such as those defined in commonly used dictionaries, should be interpreted as having a meaning that is consistent with their meaning in the context of the relevant art and are not to be interpreted in an idealized or overly formal sense unless expressly so defined herein.

In the following description, a detailed description of known functions and configurations incorporated herein will be omitted when it may obscure the subject matter with unnecessary detail. The terms used herein are defined in consideration of functions according to exemplary embodiments, and can be varied according to a purpose of a user or manager, a precedent, or the like. Therefore, definitions of the terms should be made on the basis of the overall context.

FIG. 1 is a block diagram illustrating a three-dimensional (3D) image display system according to an exemplary embodiment of the present invention.

Referring to FIG. 1, a 3D image display system 130 is connected to a display device 110 and a content provider 120. The display device 110 is a device which displays a 3D image and includes an auto-stereoscopic multi-view or super multi-view display device. In addition, the display device 110 may be implemented by using a parallax barrier, a lenticular lens, or a linear light source for parallax separation.

The display device 110 provides profile information including hardware characteristics of the display device 110 to the 3D image display system 130, receives a multi-view or super multi-view image generated by the 3D image display system 130, and displays the image.

The content provider 120 provides content to be displayed through the display device 110 to the 3D image display system 130, and may preferably store and manage contents. The content includes auto-stereoscopic multi-view or super multi-view 3D image content.

The 3D image display system 130 is provided with the profile by the display device 110, provided with the content by the content provider 120, and generates an image that is consistent with the profile. In addition, the 3D image display system 130 provides the generated image to the display device 110 so that the image is displayed by the display device 110. For example, the 3D image display system 130 may be implemented as a server which is connected to the display device 110 and the content provider 120 through a network, may be implemented as a part of the display device 110, or may be implemented as a device to be attached to the display device 110.

Figure 2:
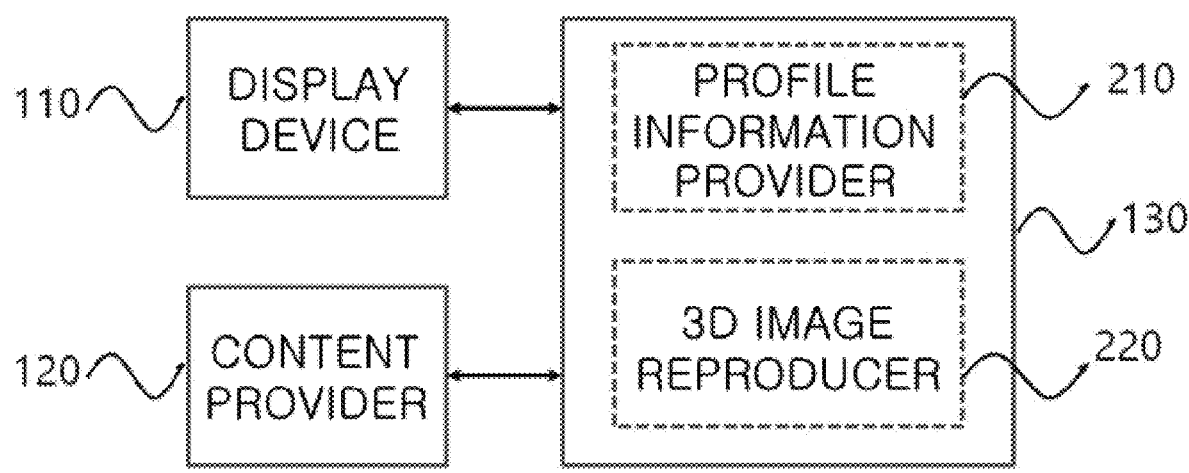
FIG. 2 is a block diagram for describing the 3D image display system of FIG. 1 in more detail.

FIG. 2 is a block diagram for describing the 3D image display system of FIG. 1 in more detail.

Referring to FIG. 2, the 3D image display system 130 may include a profile information provider 210 and a 3D image reproducer 220.

The profile information provider 210 receives the profile information including hardware characteristics of the display device 110 from the display device 110. That is, the profile information provider 210 may be provided with information on whether the display device 110 is a super multi-view exclusive display device, a multi-view 3D display device, or a general display device.

The 3D image reproducer 220 plays an image according to the profile information by using the content provided by the content provider 120. That is, the 3D image reproducer 220 collects information on the hardware characteristics of the 3D image display device from the profile information provider 210 and renders image content according to the profile information. In this case, the 3D image reproducer 220 automatically generates content to be played in any display device regardless of hardware characteristics of the display device.

Figure 4:
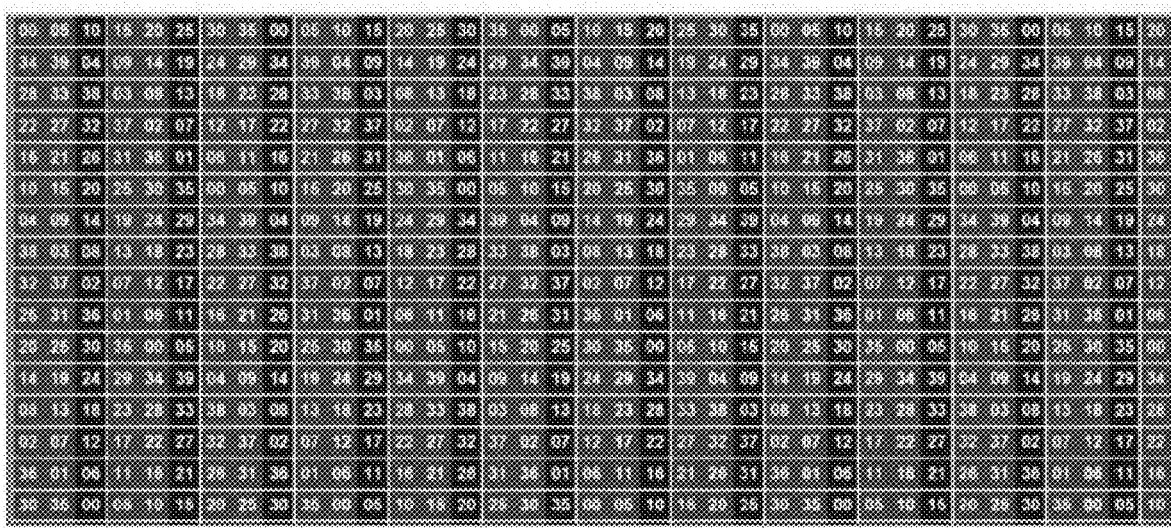
FIG. 4 is a diagram showing an example of an index map.

Specifically, examples of information included in the hardware profile information of the 3D image display device are shown in FIG. 3. Referring to the table in FIG. 3, the profile information, which defines the hardware characteristics of the 3D image display device, may include the number of pixels in width "screenWidth" of the display, the number of pixels in height "screenHeight" of the display, the number of viewpoints "viewpoints," a physical size in width "physicalWidth" of the display, a physical size in height "physicalHeight" of the display, a distance "offset" between neighboring viewing zones, a distance "distance" between the display and an observer, and an index map "indexmap." Here, an example of the index map is shown in FIG. 4, which indicates a viewpoint arranged on each sub-pixel of the display.

In one embodiment, instead of the index map in the table of FIG. 3, the profile information defining the hardware characteristics of the 3D image display device may include variable values of a numerical expression which mathematically expresses information of the index map. For example, the numerical expression may be as follows:

[Numerical Expression]curViewIndex=int(mod($x$
OffsetAboutScreenCoord*($Fc\cdot s$)+c
OffsetAboutRGB*float($i$)+$y$Offset
AboutScreenCoord*$Fc\cdot t$+startView-
Index,viewCount));

For example, the profile information of the display device 110 may be as shown in FIG. 5, and a combination of the profile of FIG. 5 and the above numerical expression may replace the index map of the display device 110. The profile of FIG. 5 is an example for a 30-inch 40-viewpoint autostereoscopic super multi-view display.

In detail, "viewCount" shown in FIG. 5 represents the number of viewpoints that the super multi-view display device can represent, and the example of FIG. 5 has 40 viewpoints.

The term "monitorResolution" shown in FIG. 5 represents the number of physical pixels of the super multi-view display device. FIG. 5 shows an example in which the super multi-view display device has 2560 pixels in width and 1600 pixels in height.

The term "viewOffsetRotate" shown in FIG. 5 represents an arrangement angle for R, G, and B sub-pixels used to compensate for a reduction of the number of pixels for image of each viewpoint of the super multi-view display device. In the example of FIG. 5, an angle of an array consisting of R, G, and B sub-pixels is represented as a proportion between a distance in an x-axis direction and a distance in a y-axis direction.

The term "viewFocalLength" shown in FIG. 5 represents a distance of a rotation center of image of each viewpoint provided by the super multi-view display device. In the example of FIG. 5, the distance of the rotation center is represented as a reciprocal number.

The term "xOffsetAboutScreenCoord" shown in FIG. 5 represents a difference in index values between physically neighboring pixels in a horizontal direction of the super multi-view display device. The example of FIG. 5 shows that the difference in index values increases as pixels moves from the left to the right.

The term "yOffsetAboutScreenCoord" shown in FIG. 5 represents a difference in index values between physically neighboring pixels in a vertical direction of the super multi-view display device. The example of FIG. 5 shows that the difference in index values increases as pixels moves from the top to the bottom.

The term "cOffsetAboutRGB" shown in FIG. 5 represents a difference in index values between physical sub-pixels in the horizontal direction of the super multi-view display device. The example of FIG. 5 shows that the difference in index values on a sub-pixel-by-sub-pixel basis increases as pixels move from the left to the right.

The term "startViewIndex" shown in FIG. 5 represents a start viewpoint that a pixel of the super multi-view display device represents. In the example of FIG. 5, the term "startViewIndex" is an index value of a viewpoint represented by the first sub-pixel on the upper left of the super multi-view display device.

The combination of the profile of FIG. 5 and the above numerical expression may replace the index map of the super multi-view display device. For instance, when index values of all physical sub-pixels of the super multi-view display device are calculated by combining the display profile of FIG. 5 and the above numerical expression, the same information as the index map shown in FIG. 4 may be generated.

Therefore, the profile information defining the hardware characteristics of the 3D image display device may include at least the number of pixels in width, the number of pixels in height, the number of viewpoints, and an index map according to one embodiment, or may include at least the number of pixels in width, the number of pixels in height, the number of viewpoints, a width size, a height size, a distance between neighboring viewing zones, and a distance between the display and an observer according to another embodiment.

Figure 6:
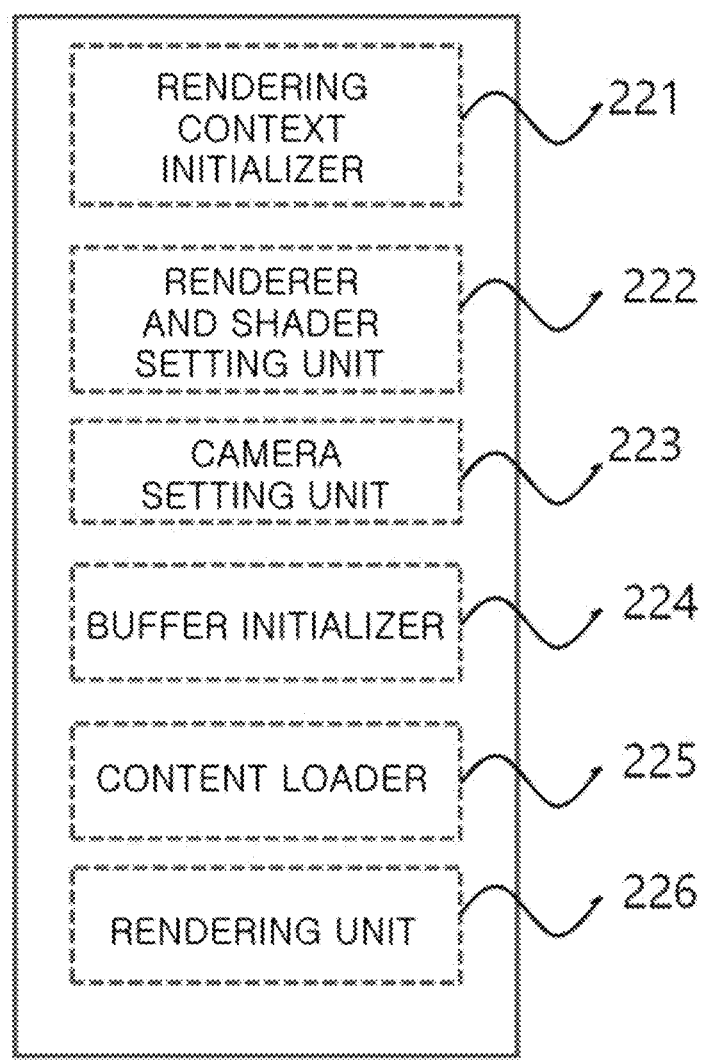
FIG. 6 is a block diagram for describing a 3D image reproducer illustrated in FIG. 2 in detail.

Hereinafter, the 3D image reproducer will be described in detail with reference to FIG. 6. FIG. 6 is a block diagram for describing the 3D image reproducer illustrated in FIG. 2 in detail.

Referring to FIG. 6, the 3D image reproducer includes a rendering context initializer 221, setting unit for a renderer and shader 222, a camera setting unit 223, a buffer initializer 224, a content loader 225, and a rendering unit 226.

The rendering context initializer 221 performs initialization necessary for rendering by using information including the numbers of viewpoints, pixels in width, and pixels in height which are provided in the display profile. The initialization includes setting the number of pixels for rendering image of each viewpoint.

The setting unit for renderer and shader 222 set a renderer and a shader. In the setting of the renderer, a light source is added and a viewport is set. An angle of view and a distance of the viewport for actual rendering is set by using a resolution of a screen (the numbers of pixels in width and height), the physical size of the screen (width and height), and an optimal viewing distance, which are provided by the display profile. The light source for rendering 3D content may be added by using the same method as a general 3D graphics rendering pipeline. In the setting of the shader, a multi-view or super multi-view shader for multiplexing multi-view or super multi-view images may be set in addition to the basic shader setting for rendering general 3D content. After scenes of respective viewpoints represented by the multi-view or super multi-view display are rendered and stored in a buffer, the shader is set for calculating information on colors to be actually represented by subpixels of physical pixels of the multi-view or super multi-view display.

The camera setting unit 223 sets a camera position of each viewpoint for rendering each scene of respective viewpoints represented by the multi-view or super multi-view display.

The buffer initializer 224 sets and initializes a buffer configured to store results of rendering image of each viewpoint to be used in the multi-view or super multi-view shader.

The content loader 225 reads the image content to be played by the multi-view or super multi-view display from the content provider 120.

The rendering unit 226 renders the image content.

Figure 7:
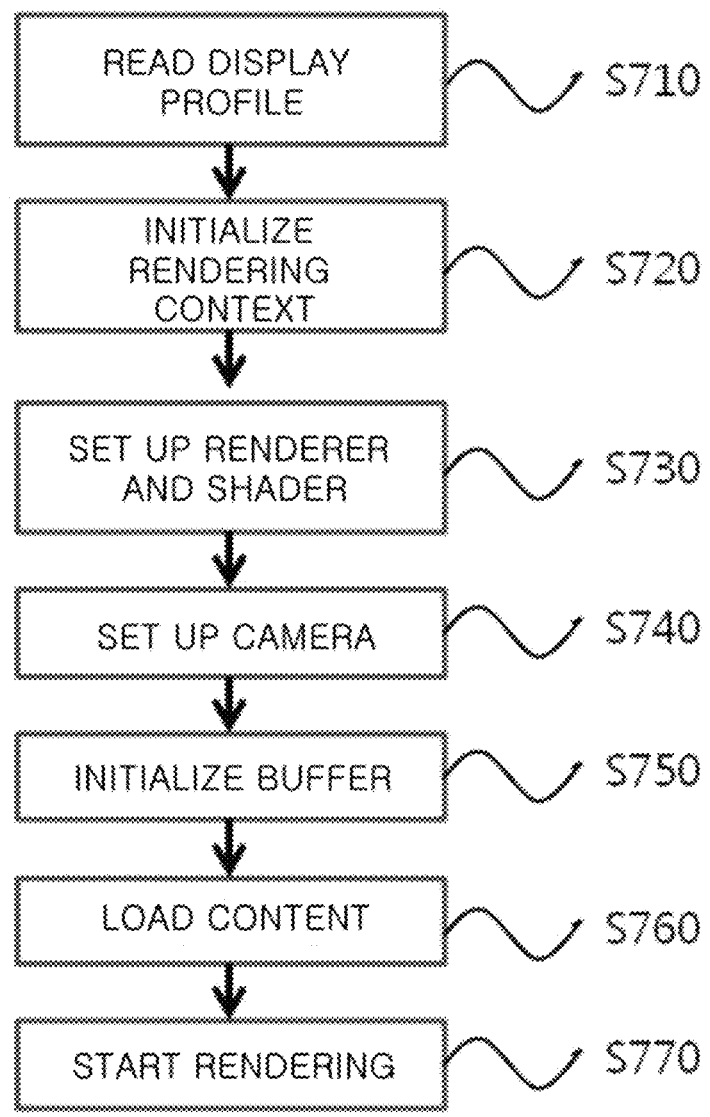
FIG. 7 is a flowchart illustrating a 3D image display method according to an exemplary embodiment of the present invention.

Hereinafter, a 3D image display method according to an exemplary embodiment of the present invention will be described. FIG. 7 is a flowchart illustrating a 3D image display method according to the exemplary embodiment of the present invention.

For example, referring to FIG. 7, a display profile is read (S710) and rendering context is initialized (S720).

Then, a renderer and a shader are set (S730). In the setting of the renderer, a light source is added and a viewport is set. In the setting of the shader, a super multi-view shader for multiplexing super multi-view images may be set in addition to a basic shader setting for rendering general 3D content.

Thereafter, cameras are set (S740). In the setting of the cameras, a camera position of each viewpoint is set to render each scene respective viewpoints represented by the super multi-view display.

Then, a buffer is initialized (S750). In the initialization of the buffer, a buffer configured to store the result of rendering scene of image of each viewpoint to be used in the super multi-view shader is set and initialized.

Then, content is loaded (S760). In the loading of the content, content to be played by the 3D display device is read. Thereafter, rendering of the read content is started (S770).

The present invention is more effective when applied to a multi-view or super multi-view content providing system connected to an Internet service. In providing content of a virtual reality service using Internet broadcasting or a wired/wireless communication, the present invention is effective in providing the content by automatically recognizing a multi-view or super multi-view image display possessed by a user.

A method of processing information according to an embodiment of the present invention may also be embodied as a computer readable code on a computer readable recording medium. The computer readable recording medium is any data storage device that may store data which maybe thereafter read by a computer system.

Examples of the computer readable recording medium include a read-only memory (ROM), a random-access memory (RAM), a compact disc ROM (CD-ROM), a magnetic tape, a hard disk, a floppy disk, a portable data storage device, a non-volatile memory (flash memory), and an optical data storage device.

The computer readable recording medium may also be distributed over network coupled computer systems so that the computer readable code is stored and executed in a distributed fashion.

According to the present invention, it is possible to easily generate and provide multi-view or super multi-view 3D content regardless of a type of multi-view or super multi-view display which is fragmented according to specific physical characteristics and methods.

In addition, a user of a multi-view or super multi-view image display is allowed to easily use multi-view or super multi-view image content without identifying physical characteristics of the display.

Moreover, it is possible to play the same content using various multi-view or super multi-view image display implementation methods without limiting or unifying the multi-view or super multi-view image display methods to one specific method.

While the exemplary embodiments of the multi-view or super multi-view image display system and information processing method according to the present invention have been particularly shown and described with reference to exemplary embodiments thereof, it should be understood by those of ordinary skill in the art that various changes in form and details may be made therein without departing from the spirit and scope of the present invention as defined by the following claims.

REFERENCE NUMERALS

110: DISPLAY DEVICE
120: CONTENT PROVIDER
130: 3D IMAGE DISPLAY SYSTEM
210: PROFILE INFORMATION PROVIDER
220: 3D IMAGE REPRODUCER
221: RENDERING CONTEXT INITIALIZER
222: RENDERER AND SHADER SETTING UNIT
223: CAMERA SETTING UNIT
224: BUFFER INITIALIZER
225: CONTENT LOADER
226: RENDERING UNIT

What is claimed is:

1. A three-dimensional (3D) image display system comprising:
   a profile information provider configured to generate profile information of a 3D image display device by defining hardware characteristics of types of 3D image display devices, defining the hardware characteristics being performed by generating profile information and using a numerical expression which including variable values of an index map corresponding to one of the types of 3D image display devices, the types of 3D image display devices including at least one of an auto-stereoscopic multi-view device and a super multi-view display device; and
   a 3D image reproducer configured to collect information of the hardware characteristics of the 3D image display device being defined from the profile information provider and to render image content according to the profile information regardless of differences of hardware characteristics of the types of 3D image display devices by replacing index map of different types of the 3D image display devices with combination of the generated profile information and the numerical expression, the differences of hardware characteristics including at least one of a number of pixels in width, a number of pixels in height, a number of viewpoints, a physical size in width, a physical size in height of one of the 3D image device displays, and a distance between one of the 3D image device displays and an observer,
   wherein the 3D image reproducer includes:
      a rendering context initializer configured to perform initialization necessary for rendering by using the profile information;
      a setting unit for a renderer and a shader;
      a camera setting unit configured to set a camera position of each viewpoint for rendering each scene of respective viewpoints represented by the 3D image display device;
      a buffer initializer configured to set up and initialize a buffer configured to store a result of rendering each viewpoint image to be used in the shader;
      a content loader configured to read image content to be played by the 3D image display device; and
      a rendering unit configured to render the image content.

2. The 3D image display system of claim 1, wherein the profile information includes at least one of a number of pixels in width, a number of pixels in height, a number of viewpoints, and an index map of the 3D image display device.

3. The 3D image display system of claim 2, wherein the index map is information about a viewpoint arranged on each sub-pixel of the 3D image display device.

4. The 3D image display system of claim 1, wherein the profile information includes at least one of a number of pixels in width, a number of pixels in height, a number of viewpoints, a width size, a height size, a distance between neighboring viewing zones of the 3D image display device, and a distance between the 3D image display device and an observer.

5. The 3D image display system of claim 1, wherein the rendering context initializer includes a setting of the number of pixels for rendering images of each of the viewpoint.

6. The 3D image display system of claim 1, wherein the setting unit for the renderer and the shader adds a light source and sets a viewport when setting the renderer.

7. The 3D image display system of claim 1, wherein:
   the profile information provider is connected to the 3D image display device; and
   the 3D image reproducer is connected to the content provider and receives the image content.

8. The 3D image display system of claim 1, wherein the image content is auto-stereoscopic multi-view image content or super multi-view image content.

9. A 3D image display method comprising:
   generating profile information of a 3D image display device by defining hardware characteristics of types of 3D image display devices, wherein defining the hardware characteristics comprises generating profile information and using a numerical expression which including variable values of an index map corresponding to one of the types of the 3D image display devices, the types of 3D image display devices including at least one of an auto-stereoscopic multi-view device and a super multi-view display device;
   collecting information of the hardware characteristics of the 3D image display device being defined from the profile information provider;
   initializing a rendering context by using the generated profile information;
   setting a renderer and a shader;
   setting a camera position of each viewpoint for rendering each scene of respective viewpoints represented by types of the 3D image display devices;
   setting and initializing a buffer configured to store a result of rendering image of each viewpoint used in the shader;
   loading image content to be played by the 3D image display device; and
   rendering the image content regardless of differences of hardware characteristics of the types of 3D image display devices by replacing index map of different types of the 3D image display devices with combination of the generated profile information and the numerical expression,
   the differences of hardware characteristics including at least one of a number of pixels in width, a number of pixels in height, a number of viewpoints, a physical size in width, a physical size in height of one of the 3D image device displays, and a distance between one of the 3D image device displays and an observer.

10. The 3D image display method of claim 9, wherein the profile information includes at least one of a number of pixels in width, a number of pixels in height, a number of viewpoints, and an index map of the 3D image display device.

11. The 3D image display method of claim 10, wherein the index map is information about a viewpoint arranged on each sub-pixel of the 3D image display device.

12. The 3D image display method of claim 9, wherein the profile information includes at least one of a number of pixels in width, a number of pixels in height, a number of viewpoints, a width size, a height size, a distance between neighboring viewing zones of the 3D image display device, and a distance between the 3D image display device and an observer.

13. The 3D image display method of claim 9, wherein the initializing of the rendering context includes setting the number of pixels for rendering images of each of the viewpoint.

14. The 3D image display method of claim 9, wherein the setting of the renderer and the shader includes adding a light source and setting a viewport.

15. The 3D image display method of claim 9, wherein the image content is auto-stereoscopic multi-view image content or super multi-view image content.

16. The 3D image display system of claim 1, wherein the generated profile information includes at least one of viewCount which represents each of a number of viewpoints of the auto-stereoscopic multi-view device or the super multi-view display device, monitorResolution which represents a number of physical pixels of the multi-view display device, viewOffsetRotate which represents an arrangement angle for R, G, and B sub-pixels used to compensate for a reduction of the number of pixels for image of each viewpoint of the auto-stereoscopic multi-view device or the super multi-view display device, viewFocalLength which represents a distance of a rotation center of image of each viewpoint provided by the auto-stereoscopic multi-view device or the super multi-view display device, xOffsetAboutScreenCoord which represents a difference in index values between physically neighboring pixels in a horizontal direction of the auto-stereoscopic multi-view device or the super multi-view display device, yOffsetAboutScreenCoord which represents a difference in index values between physically neighboring pixels in a vertical direction of the auto-stereoscopic multi-view device or the super multi-view display device, cOffsetAboutRGB which represents a difference in index values between physical sub-pixels in the horizontal direction of the auto-stereoscopic multi-view device or the super multi-view display device, and startViewlndex which represents a start viewpoint that a pixel of the auto-stereoscopic multi-view device or the super multi-view display device.

17. The 3D image display method of claim 9, wherein the generated profile information includes at least one of viewCount which represents each of a number of viewpoints of the auto-stereoscopic multi-view device or the super multi-view display device, monitorResolution which represents a number of physical pixels of the auto-stereoscopic multi-view device or the super multi-view display device, viewOffsetRotate which represents an arrangement angle for R, G, and B sub-pixels used to compensate for a reduction of the number of pixels for image of each viewpoint of the auto-stereoscopic multi-view device or the super multi-view display device, viewFocalLength which represents a distance of a rotation center of image of each viewpoint provided by the auto-stereoscopic multi-view device or the super multi-view display device, xOffsetAboutScreenCoord which represents a difference in index values between physically neighboring pixels in a horizontal direction of the auto-stereoscopic multi-view device or the super multi-view display device, yOffsetAboutScreenCoord which represents a difference in index values between physically neighboring pixels in a vertical direction of the auto-stereoscopic multi-view device or the super multi-view display device, cOffsetAboutRGB which represents a difference in index values between physical sub-pixels in the horizontal direction of the auto-stereoscopic multi-view device or the super multi-view display device, and startViewlndex which represents a start viewpoint that a pixel of the auto-stereoscopic multi-view device or the super multi-view display device.

* * * * *